United States Patent
Myung

(10) Patent No.: US 10,589,207 B2
(45) Date of Patent: Mar. 17, 2020

(54) DUST COLLECTOR DIAPHRAGM VALVE CAPABLE OF PERFORMING MANUAL EMERGENCY OPERATION

(71) Applicant: Jin-Suk Myung, Suwon-si (KR)

(72) Inventor: Jin-Suk Myung, Suwon-si (KR)

( * ) Notice: Subject to any disclaimer, the term of this patent is extended or adjusted under 35 U.S.C. 154(b) by 35 days.

(21) Appl. No.: 16/092,912

(22) PCT Filed: Jun. 9, 2017

(86) PCT No.: PCT/KR2017/006017
§ 371 (c)(1),
(2) Date: Oct. 11, 2018

(87) PCT Pub. No.: WO2018/012742
PCT Pub. Date: Jan. 18, 2018

(65) Prior Publication Data
US 2019/0160414 A1  May 30, 2019

(30) Foreign Application Priority Data

Jul. 11, 2016 (KR) .......................... 10-2016-0087509

(51) Int. Cl.
*B01D 46/42* (2006.01)
*F16K 31/385* (2006.01)
(Continued)

(52) U.S. Cl.
CPC ..... *B01D 46/4272* (2013.01); *B01D 46/0068* (2013.01); *F16K 7/12* (2013.01);
(Continued)

(58) Field of Classification Search
CPC ............ B01D 46/4272; B01D 46/0068; B01D 46/0095; F16K 31/402; F16K 31/385;
(Continued)

(56) References Cited

U.S. PATENT DOCUMENTS 5,404,902 A * 4/1995 Wen ........................ F04C 15/06
137/489
5,520,366 A * 5/1996 Elliott ................... F16K 31/402
251/30.01

(Continued)

FOREIGN PATENT DOCUMENTS

KR    20-0269265 Y1    3/2002
KR    10-0828487 B1    5/2008

(Continued)

*Primary Examiner* — John Bastianelli
(74) *Attorney, Agent, or Firm* — KORUS Patent, LLC; Seong Il Jeong

(57) ABSTRACT

A dust collector diaphragm valve capable of performing manual emergency operation according to the present invention is configured to perform control so that the internal equal pressure of the diaphragm valve can be broken due to an internal pressure drop attributable to an instantaneous air discharge occurring whenever an emergency operation switch is manually pressed when a pulse operation signal or solenoid valve used to operate the diaphragm valve fails, and thus a rubber plate installed between the body and cover of the diaphragm valve can be turned (moved forward) after being instantaneously moved backward. Accordingly, dedusting work can be manually performed according to the determination of a manager, and thus the dust collector diaphragm valve can prevent an emergency shutdown during the operation of a dust collector and can also prevent a filter from reaching a limit differential pressure, thereby preventing the lifespan of the filter from being shortened.

7 Claims, 7 Drawing Sheets

(51) Int. Cl.
*F16K 31/40* (2006.01)
*F16K 17/10* (2006.01)
*F16K 31/44* (2006.01)
*F16K 7/12* (2006.01)
*F16K 15/02* (2006.01)
*B01D 46/00* (2006.01)

(52) U.S. Cl.
CPC .............. *F16K 15/02* (2013.01); *F16K 17/10* (2013.01); *F16K 31/385* (2013.01); *F16K 31/402* (2013.01); *F16K 31/44* (2013.01); *B01D 46/0095* (2013.01)

(58) Field of Classification Search
CPC . F16K 15/02; F16K 7/12; F16K 31/44; F16K 17/10; F16K 39/026; F16K 24/04; F15B 13/043; F15B 13/0431; F15B 13/0433
USPC ................................ 251/30.01–30.05, 129.17
See application file for complete search history.

(56) References Cited

U.S. PATENT DOCUMENTS

| | | | | |
|---|---|---|---|---|
| 6,073,905 A | * | 6/2000 | Wilson | B01D 46/0068 137/508 |
| 6,354,562 B1 | * | 3/2002 | Fukano | B01D 46/0068 251/30.02 |
| 6,916,002 B2 | * | 7/2005 | Hsi-Chun | F16K 7/17 137/489 |
| 8,881,759 B1 | * | 11/2014 | Shtekelmacher | F16K 31/402 137/489 |

FOREIGN PATENT DOCUMENTS

| | | |
|---|---|---|
| KR | 10-2008-0054304 A | 6/2008 |
| KR | 10-2012-0078002 A | 7/2012 |
| KR | 10-1182721 B1 | 9/2012 |

\* cited by examiner

DUST COLLECTOR DIAPHRAGM VALVE CAPABLE OF PERFORMING MANUAL EMERGENCY OPERATION

TECHNICAL FIELD

The present invention relates to a dust collector diaphragm valve capable of performing manual emergency operation, and more specifically to a dust collector diaphragm valve capable of performing manual emergency operation, which enables a diaphragm valve to be manually operated according to the determination of a manager when a timer or solenoid valve fails.

BACKGROUND ART

An atmospheric environmental problem has become more and more serious due to the pollution materials generated by the development of the industry. Atmospheric pollution causes many health problems including respiratory diseases in the human body, and also causes a lot of damage to plants and properties. Among the pollution materials, the most abundant atmospheric pollution material is dust. In order to efficiently control and operate the emission of dust, it is necessary to identify the characteristics of generated gas and dust and install appropriate dust collection facilities.

Currently, widely used dust collection technologies include scrubbing-type dust collection technology, electrostatic dust collection technology, and filter-type dust collection technology.

Scrubbing-type dust collection technology is a technology designed to collect dust particles in such a way as to generate liquid droplets by applying physical force to a spray liquid and to collide and contact the liquid droplets with dust-containing gas, and can also process harmful gas. Although in most cases, water is used as a cleaning liquid, toxic gas may be removed by reacting the toxic gas with a liquid obtained by adding chemical additives to a spray liquid. This scrubbing-type dust collection technology is problematic in that it is difficult to apply the scrubbing-type dust collection technology to the collection of dust contained in gas under high-temperature and high-pressure conditions and wastewater processing cost is rather high.

Electrostatic dust collecting technology is technology designed to charge particles, such as dust and mist, contained in discharge gas by means of corona discharge and to move the particles to the surface of a dust collection electrode plate and then collect the particles by means of an electric field. This electrostatic dust collecting technology is efficient to remove pollution materials in a place where a large amount of dust is discharged, such as a power plant, a cement sintering furnace, a glass melting furnace, and an incineration plant.

Filter-type dust collection technology is technology that exhibits the best dust collecting performance compared to other dust collection technologies, and recently it has been widely used in dust generation processes and combustion facilities. Although it is difficult to apply a filter dust collector under a condition in which the bad condition of exhaust gas is present and a large amount of moisture is contained, a filter appropriate for the conditions of gas to be processed and the characteristics of dust to be collected has been developed and used. In this filter-type dust collection technology, there is required the process of dedusting dust collected in a filter. For this purpose, it is necessary to perform dedusting by means of a timer, a solenoid valve, and a diaphragm valve.

Therefore, the proposed preceding Korean Patent No. 0828487 (May 2, 2008) is configured such that dust-containing air is introduced into a dust collection chamber via a transfer pipe and passed through a collision plate 1, dust is adhered to the surface of a filter 4, and filtered clean air is passed through a filter case 3 inside the filter 4 and discharged through an upper atmospheric dump valve 9, as shown in FIG. 1.

The dust adhered to the surface of the filter 4 is continuously and automatically cleaned by a diaphragm valve 5, i.e., pulse jet-type cleaning equipment, and dust 2 is collected in a lower hopper and discharged through a discharge device 10.

A cleaning device is installed below an air header 7 installed outside a dust collector, and instantaneously sprays high-pressure air (of 4 to 5 Kg/cm$^2$) from the blow tube 8 (for 0.2 seconds) by the sequential operation of the diaphragm valve 5, so that secondary air that is 5 to 7 times the amount of sprayed air can be sucked from the surroundings and introduced into the filter 4. At the moment, the dust adhered to the filter 4 can be efficiently cleaned by means of the instantaneous vibration attributable to a pulsating shock and the air flowing back to the outside.

The diaphragm valve 5 performs the cleaning operation of the filter 4 in such a manner that, when a pulse operation signal is received by a solenoid valve 5-5 from a program logic controller (PLI), internal pressure is released via a vent 5-4, a rubber plate 5-2 is instantaneously moved backward and returned (moved forward), and thus high-pressure air is supplied to a blow tube 8 connected to an outlet side 5-7, as shown in FIG. 2. In this case, a low-tension spring 5-3 configured to withstand internal pressure and mediate impact upon the application of a pulse is installed behind the rubber plate 5-2.

Meanwhile, a detection device 11 for the erroneous operation of a diaphragm valve is installed in the vent 5-4 of the diaphragm valve 5. In other words, the detection device 11 for the erroneous operation of a diaphragm valve includes a body 11-4 configured such that a ball 11-3 adapted to is vertically moved by pressure discharged from the vent 5-4 of the diaphragm valve 5 is contained therein, a detection unit configured to detect a pulse operation signal according to the lifting of the ball 11-3 inside the body 11-4, and a countermeasure unit configured to detect the occurrence of the abnormality of the diaphragm valve 5 and transfer the information to an electronic valve.

Furthermore, the detection unit is connected via wire so that a signal can be transferred to an input/output terminal box 11-9 containing a timer upon the application of a pulse in a state in which a hollow cylindrical fastening flange 11-2 has been connected to the top of the body 11-4 and the top of the hollow cylindrical fastening flange 11-2 has been covered with a cap 11-1 containing a limit switch.

An electronic valve 11-6, i.e., a device configured to block discharge gas when the erroneous operation of the diaphragm valve 5 is detected, is installed on the side flange of the body 11-4, the operation wiring of the electronic valve 11-6 is connected to the input/output terminal box 11-9, a nipple 11-7 having threads on both sides thereof is fastened, and an elbow-type pressure vent 11-8 is connected, thereby completing the countermeasure unit.

However, since the above-described conventional technology includes the detection unit configured to detect a pulse operation signal in response to an increase in pressure released from the vent 5-4 of the diaphragm valve 5 and the countermeasure unit configured to detect the occurrence of the abnormality of the diaphragm valve 5 and transfer the information to the electronic valve 11-6, it can prevent differential pressure inside a dust collection chamber from increasing upon the erroneous operation of the diaphragm valve 5 and can rapidly take a countermeasure upon the occurrence of an abnormality. However, this configuration is problematic in that there occurs an accident in which the operation of the operating dust collector must be abruptly shut down because the diaphragm valve 5 cannot be operated when any one of the input/output terminal box 11-9 containing a timer, the electronic valve 11-6, and the solenoid valve 5-5 fails in a state in which the diaphragm valve 5 is not normally operated. When an emergency shutdown is not performed, the filter 4 reaches a limit differential pressure, so that problems arise in that lifespan is shortened and in that dust is discharged to the air when the filter 4 is damaged and, thus, atmospheric environmental pollution is caused.

DISCLOSURE

Technical Problem

The present invention has been proposed to overcome the above-described problems, and an object of the present invention is to provide a dust collector diaphragm valve capable of performing manual emergency operation, which can prevent an emergency shutdown from occurring during the operation of a dust collector and can also prevent a filter from reaching a limit differential pressure, due to the manual operation of a diaphragm valve in case of emergency, thereby preventing the lifespan of the filter from being shortened.

Technical Solution

In order to accomplish the above object, according to an embodiment of the present invention, there is provided a dust collector diaphragm valve capable of performing manual emergency operation, the dust collector diaphragm valve including: a body configured such that an air inlet part and an air outlet part are formed in two directions as an internal air flow path and a passage are connected to each other; a cover configured such that a pressure vent is formed on one side thereof as an internal air flow path and a passage are connected to each other; a rubber plate configured to be installed between the body and the cover so that high-pressure air supplied through the air inlet part simultaneously fills both the air flow paths, forms equal pressure, and closes a passage of the air outlet part; a solenoid valve configured to be installed behind the cover so that an internal plunger instantaneously opens the pressure vent while being returned (moved forward) by elastic repulsive force after being instantaneously moved backward in response to a pulse operation signal, thereby dropping internal pressure in the air flow path; and a spring configured to be installed at a center of a back side of the rubber plate in order to return (move forward) the rubber plate until an operation of the solenoid valve is stopped and to thus make the rubber plate close the air outlet part;

wherein an emergency operation switch configured to perform control so that the rubber plate is instantaneously moved backward and then returned (moved forward) by forcibly discharging high-pressure air inside the air flow path in the cover irrespective of the pressure vent whenever the emergency operation switch is manually pressed when a pulse operation signal and the solenoid valve fail and thus breaking equal pressure is installed on one side of the cover.

As another embodiment, the emergency operation switch is installed on one side of the periphery of the cover spaced apart from the pressure vent by a predetermined distance so that the air flow path of the cover and the passage can be connected to each other.

As another embodiment, the emergency operation switch includes: a body configured to be screwed through one side of the cover, and to have a through hole, in which a stop protrusion is formed inside the through hole at the intermediate height of the through hole, so that the air flow path and the passage can be connected to each other; a forceful pressure vent configured to be installed on one side of the body at the intermediate height of the body, and to always open the through hole; a coil spring configured to be inserted through a top of the through hole, and to be seated on a top of the stop protrusion; an actuation shaft configured to be disposed to pass through the top of the through hole, and provided with a head part on a bottom of the actuation shaft in order to control an amount of air to be discharged by means of pressing force while selectively opening and closing the passage depending on whether a lower portion of the actuation shaft comes into close contact with a bottom of the stop protrusion; a stop ring configured to be coupled to the actuation shaft at an intermediate height of the actuation shaft through a top of the body, and to receive elastic repulsive force of the coil spring and lift the actuation shaft when pressing force is released while the stop ring is pressing the coil spring; a sleeve configured to be inserted into an upper portion of the through hole, and to guide the actuation shaft through vertical movement while increasing tightness; and a push button configured to be fastened to an upper end of the actuation shaft.

As another embodiment, an O-ring-shaped packing configured to increase tightness when it comes into contact with a bottom of the stop protrusion is coupled to the central circumference of the top surface of the head part.

As another embodiment, the forceful pressure vent is connected to the passage of the through hole at a right angle at a location above the height of the stop protrusion.

As another embodiment, the actuation shaft is configured to maintain a predetermined interval in order to prevent circumferential surfaces from coming into contact with each other when the actuation shaft passes through the stop protrusion via the bottom of the through hole.

As another embodiment, the head part is configured to limit upward movement of the actuation shaft in such a manner that a top surface of the head part is caught on the bottom of the stop protrusion while maintaining a predetermined interval in order to prevent circumferential surfaces from coming into contact with each other when the head part passes through the stop protrusion via the bottom of the through hole.

Advantageous Effects

The dust collector diaphragm valve capable of performing manual emergency operation according to the present invention is configured such that the manual switch is installed on one side of the diaphragm valve so that the diaphragm valve can be manually operated according to the determination of a manager when a pulse operation signal, such as a timer or the like, or a solenoid valve fails, so that there are provided the effects of preventing an emergency shutdown from occurring during the operation of a dust collector and also preventing a filter from reaching a limit differential pressure, thereby preventing the lifespan of the filter from being shortened.

Figure 1:
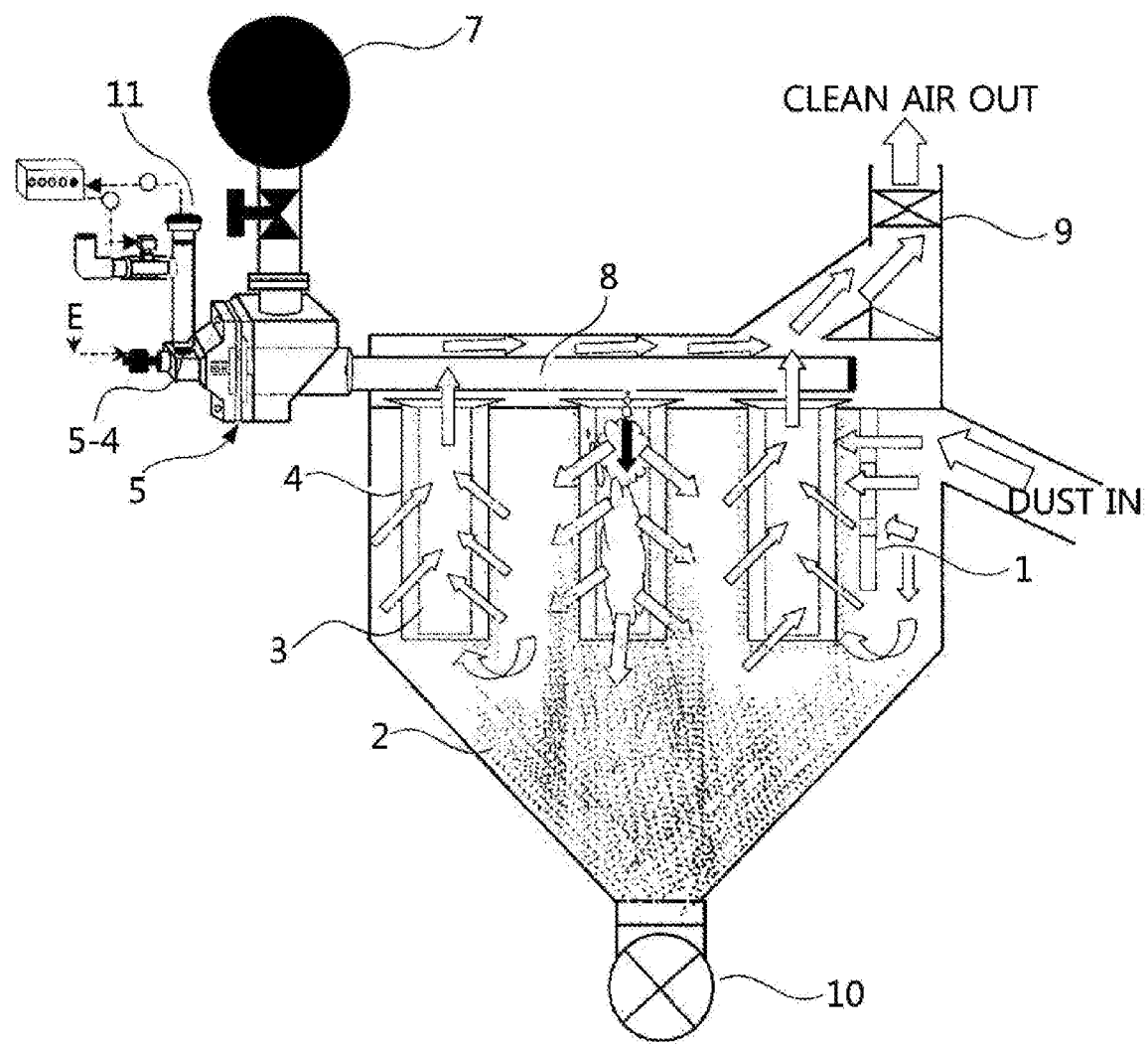
FIG. 1 is a view showing the configuration of a dust collector in which a conventional detection device for the erroneous operation of a diaphragm valve has been installed.
Figure 2:
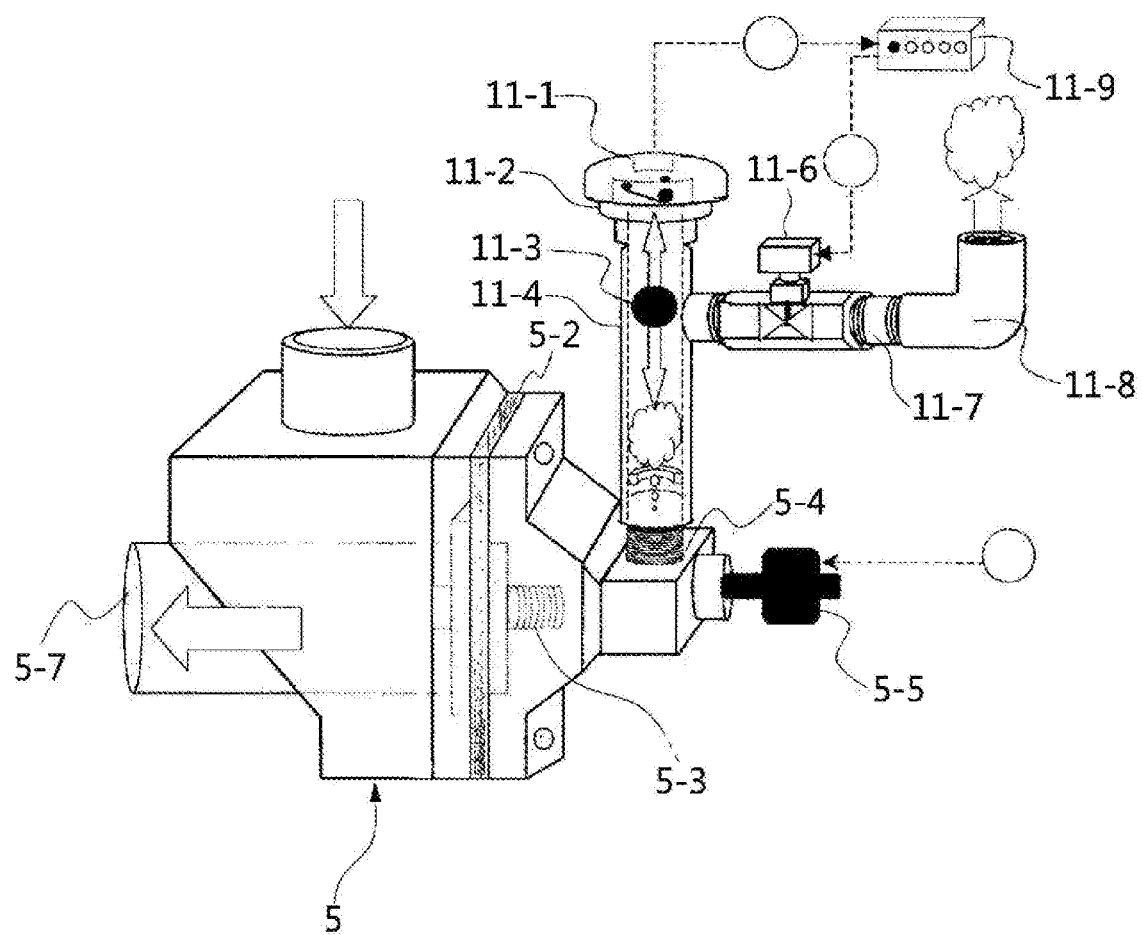
FIG. 2 is a view showing the configuration of a state in which the detection device for the erroneous operation of a diaphragm valve has been installed in the vent of a conventional diaphragm valve.

| *Description of important reference symbols in the drawings* ||
|---|---|
| 7: air header | 8: blow tube |
| 30: diaphragm valve | 31: body |
| 31a: air flow path | 32: air inlet part |
| 33: air outlet part | 34: cover |
| 34a: air flow path | 34b: pressure vent |
| 35: rubber plate | 36: solenoid valve |
| 36a: plunger | 37: spring |
| 40: emergency operation switch | 41: body |
| 41a: stop protrusion | 41b: through hole |
| 42: forceful pressure vent | 43: coil spring |
| 44: actuation shaft | 44a: head part |
| 45: packing | 46: stop ring |
| 47: sleeve | 48: fastening pin |
| 49: push button | |

BEST MODE

Figure 3:
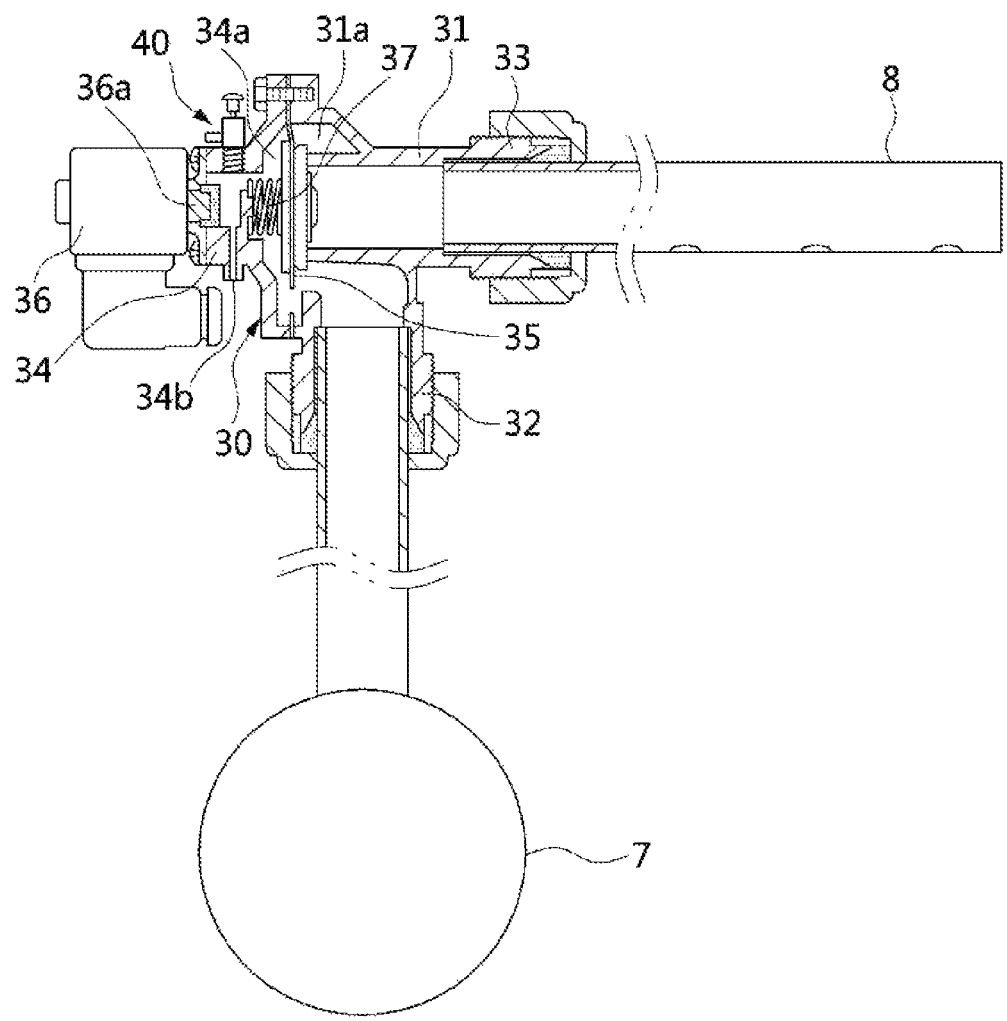
FIG. 3 is a view showing the configuration of a state in which an air header and a blow tube have been coupled to a diaphragm valve, in which an emergency operation switch according to the present invention has been installed.

Embodiments of the present invention will be described in detail below with reference to accompanying drawing FIGS. 3 to 5.

The present invention is configured such that an emergency operation switch 40 is installed on one side of the back surface of the diaphragm valve 30 so that the internal equal pressure of the diaphragm valve 30 can be broken due to an internal pressure drop attributable to an instantaneous air discharge occurring whenever the emergency operation switch 40 is manually pressed when a pulse operation signal used to operate the diaphragm valve 30 fails, thereby enabling the diaphragm valve 30 to be returned after being operated.

In other words, the diaphragm valve 30 includes: a body 31 configured such that an air inlet part 32 and an air outlet part 33 are formed in two directions as an internal air flow path 31a and a passage are connected to each other; a cover 34 configured such that a pressure vent 34b is formed on one side thereof as an internal air flow path 34a and a passage are connected to each other; a rubber plate 35 is configured to be installed between the body 31 and the cover 34 so that high-pressure air supplied through the air inlet part 32 simultaneously fills both the air flow paths 31a and 34a, forms equal pressure, and closes the passage of the air outlet part 33; and a solenoid valve 36 configured to be installed behind the cover 34 so that an internal plunger 36a instantaneously opens the pressure vent 34b while being returned (moved forward) by elastic repulsive force after being instantaneously moved backward in response to a pulse operation signal, thereby dropping internal pressure in the air flow path 34a.

In this case, the air inlet part 32 and the air outlet part 33 are where passages are connected by the air flow path 31a while forming a right angle with respect to one side of the body 31. It is preferred that the air inlet part 32 is configured to be formed under the body 31 and to be perpendicularly connected to an air header 7 and the air outlet part 33 is configured to be formed on the front of the body 31 and to be perpendicularly connected to a blow tube 8.

The emergency operation switch 40 configured to perform control so that the rubber plate 35 is instantaneously moved backward and then returned (moved forward) by forcibly discharging high-pressure air inside the air flow path 34a in the cover 34 irrespective of the pressure vent 34b whenever the emergency operation switch 40 is manually pressed when a pulse operation signal and the solenoid valve 36 fail and thus breaking equal pressure is installed on one side of the cover 34.

A spring 37 is installed at the center of the back side of the rubber plate 35 in order to return (move forward) the rubber plate 35 until the operation of the solenoid valve 36 is stopped and to thus make the rubber plate 35 close the air outlet part 33.

The plunger 36a of the solenoid valve 36 is configured to close the pressure vent 34b of the cover 34 while being returned (moved forward) by the elastic repulsive force of a spring (not shown) wound around the center of the plunger 36a.

The emergency operation switch 40 is preferably installed on one side of the periphery of the cover 34 spaced apart from the pressure vent 34b by a predetermined distance so that the air flow path 34a of the cover 34 and the passage can be connected to each other.

In other words, the emergency operation switch 40 includes: a body 41 configured to be screwed through one side of the cover 34, and to have a through hole 41b, in which a stop protrusion 41a is formed inside the through hole 41b at the intermediate height of the through hole 41b, so that the air flow path 34a and the passage can be connected to each other; a forceful pressure vent 42 configured to be installed on one side of the body 41 at the intermediate height of the body 41, and to always open the through hole 41b; a coil spring 43 configured to be inserted through the top of the through hole 41b, and to be seated on the top of the stop protrusion 41a; an actuation shaft 44 configured to be disposed to pass through the top of the through hole 41b via the bottom of the through hole 41b, and provided with a head part 44a on the bottom of the actuation shaft 44 in order to control the amount of air to be discharged by means of pressing force while selectively opening and closing the passage depending on whether the lower portion of the actuation shaft 44 comes into close contact with the bottom of the stop protrusion 41a; an O-ring-shaped packing 45 configured to be coupled to the central circumference of the top surface of the head part 44a, and to increase tightness when it comes into contact with the bottom of the stop protrusion 41a; a C-shaped stop ring 46 configured to be coupled to the actuation shaft 44 at the intermediate height of the actuation shaft 44 through the top of the body 41, and to receive the elastic repulsive force of the coil spring 43 and lift the actuation shaft 44 when pressing force is released while the C-shaped stop ring 46 is pressing the coil spring 43; a sleeve 47 configured to be inserted into the upper portion of the through hole 41*b*, and to guide the actuation shaft 44 through vertical movement while increasing tightness; and a push button 49 configured to be fastened by a fastening pin 48 that is inserted into the circumference of the upper end of the actuation shaft 44.

In this case, the forceful pressure vent 42 is connected to the passage of the through hole 41*b* at a right angle at a location above the height of the stop protrusion 41*a*.

The actuation shaft 44 is configured to maintain a predetermined interval in order to prevent circumferential surfaces from coming into contact with each other when the actuation shaft 44 passes through the stop protrusion 41*a* via the bottom of the through hole 41*b*.

The head part 44*a* is configured to limit the upward movement of the actuation shaft 44 in such a manner that the top surface of the head part 44*a* is caught on the bottom of the stop protrusion 41*a* while maintaining a predetermined interval in order to prevent circumferential surfaces from coming into contact with each other when the head part 44*a* passes through the stop protrusion 41*a* via the bottom of the through hole 41*b*.

Next, the operation and advantages of the dust collector diaphragm valve capable of performing manual emergency operation according to the present invention, which is configured as described above, will be described.

Figure 4A:
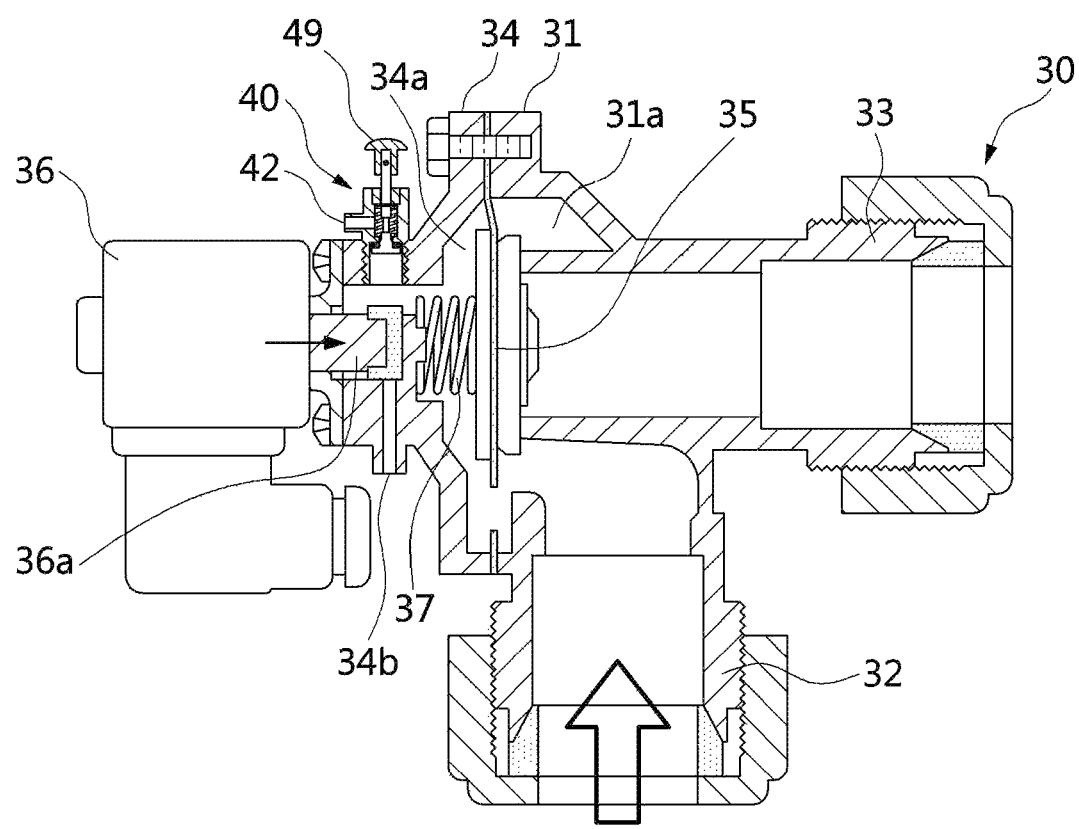
FIGS. 4a, 4b and 4c are views showing the configurations of the operating states of the diaphragm valve, to which the emergency operation switch according to the present invention has been applied, in a stepwise manner.
Figure 4B:
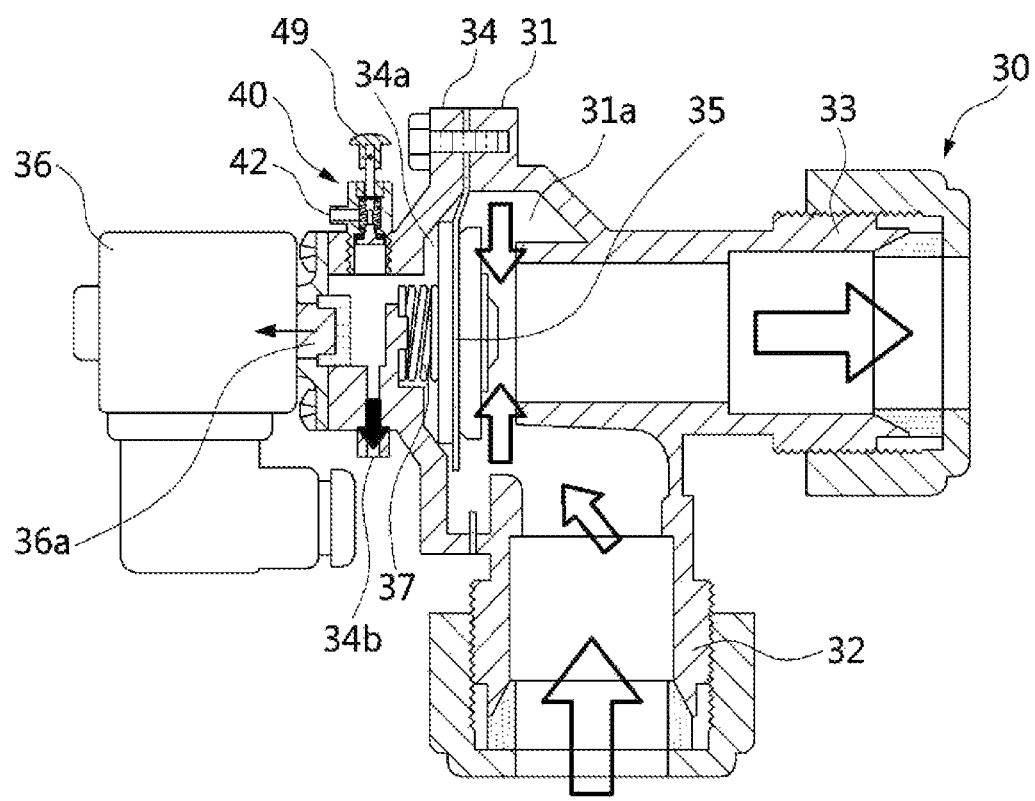
Figure 5:
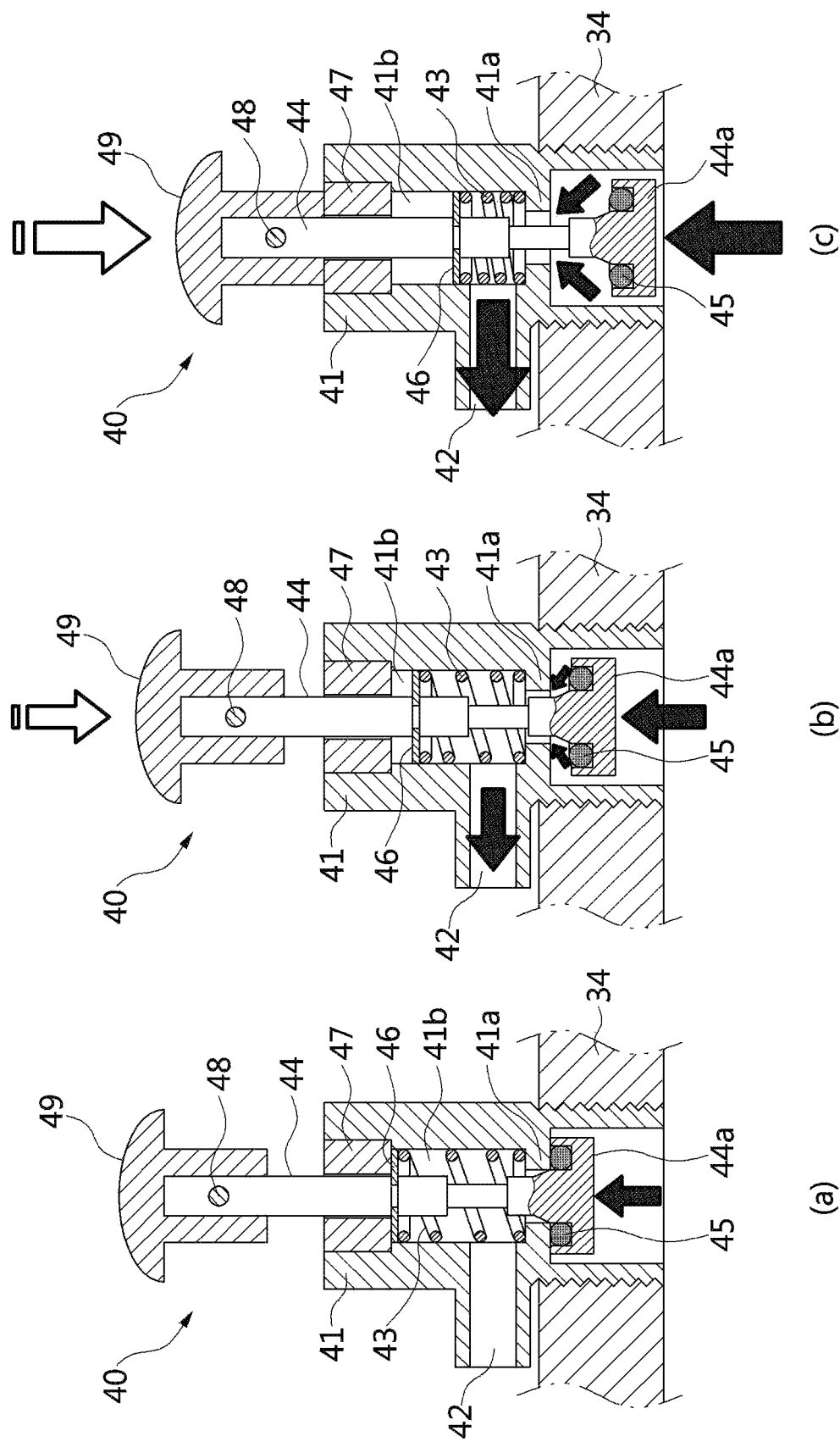
FIGS. 5a, 5b and 5c are views showing the configurations of the operating states of the emergency operation switch according to the present invention in a stepwise manner.

According to the present invention, when the solenoid valve 36 is normally operated in response to a pulse operation signal, as shown in FIG. 4*b*, in a standby state in which compressed high-pressure air in the air header 7 has been supplied into the diaphragm valve 30 via the air inlet part 32 of the body 31 and equal pressure is maintained, as shown in FIG. 4*a*, the internal pressure of the cover 34 is normally released via the pressure vent 34*b*, as indicated by the direction of the black arrow shown in FIG. 4*b*, while the plunger 36*a* of the solenoid valve 36 is being returned (moved forward) after being instantaneously moved backward, and thus equal pressure is broken so that the internal pressure of the air flow path 34*a* in the cover 34 drops below the internal pressure of the air flow path 31*a* in the body 31.

In this case, as to the internal pressure of the air flow path 31*a* in the body 31, the rubber plate 35 installed between the body 31 and the cover 34 instantaneously opens the passage of the air outlet part 33 blocked by it while being moved backward to the cover 34. Accordingly, high-pressure air is instantaneously sprayed via the blow tube 8 (for 0.2 seconds), as indicated by the directions of the white arrows shown in FIG. 4*b*, so that secondary air that is 5 to 7 times the amount of sprayed air is sucked from the surroundings and introduced into the filter 4 due to the Venturi effect.

However, when a pulse operation signal and the solenoid valve 36 used to operate the diaphragm valve 30 fail, the diaphragm valve 30 does not operate at intervals of a few seconds.

Figure 4C:
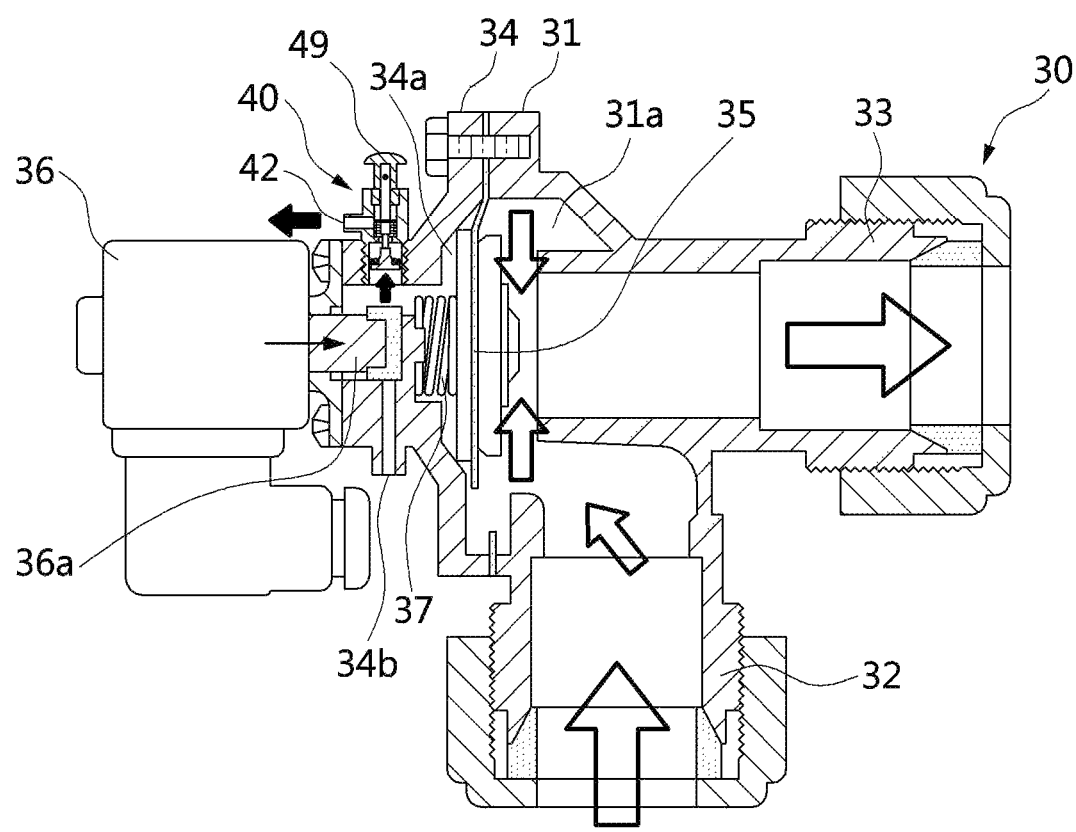

In other words, when the solenoid valve 36 does not receive a pulse operation signal, such as a timer or the like, or when the solenoid valve 36 itself fails, the plunger 36*a* of the solenoid valve 36 cannot be moved backward, as shown in FIG. 4*c*, and thus the pressure vent 34*b* of the cover 34 enters a closed state. Accordingly, the internal equal pressure of the diaphragm valve 30 cannot be broken, and thus a standby state (such as the state shown in FIG. 4*a*) in which the rubber plate 35 installed between the body 31 and the cover 34 cannot operate is entered.

In this case, when the push button 49 of the emergency operation switch 40 installed on one side of the cover 34 of the diaphragm valve 30 is manually pressed according to the determination of a manager, the actuation shaft 44 is lowered, and thus the head part 44*a* formed on the bottom of the actuation shaft 44 is spaced apart from the stop protrusion 41*a* of the body 41 by a predetermined interval, as shown in FIGS. 5*b* and 5*c*. Accordingly, the internal air in the air flow path 34*a* of the cover 34 is discharged to the outside, as indicated by the direction of the black arrows shown in FIGS. 5*a* to 5*c*, in place of the above-described pressure vent 34*b*, which drops the internal pressure of the cover 34, thereby breaking the internal equal pressure of the diaphragm valve 30. As a result, as the rubber plate 35 installed between the body 31 and cover 34 of the diaphragm valve 30 is returned (moved forward) after being instantaneously moved backward, compressed air flows toward the air outlet part 33, as indicated by the directions of the white arrows shown in FIG. 4*c*.

In other words, when a manager presses the push button 49 in the state of the emergency operation switch 40 shown in FIG. 5A, the actuation shaft 44 connected to the push button 49 is lowered, and thus the head part 44*a* formed on the bottom of the actuation shaft 44 is separated from the stop protrusion 41*a* formed in the through hole 41*b* of the body 41 at the intermediate height of the through hole 41*b*, thereby opening the forceful pressure vent 42 connected to the through hole 41*b*.

In this case, the internal compressed air confined in the air flow path 34*a* of the cover 34 enters via a gap between the circumferences of the head part 44*a* and the through hole 41*b*, and is then rapidly discharged to the outside via the forceful pressure vent 42, as indicated by the directions of the black arrows shown in FIG. 5*c*.

Furthermore, after the internal air of the cover 34 has been discharged to some extent and pressure has dropped, the lowered actuation shaft 44 is lifted by the elastic repulsive force of the coil spring 43, as shown in FIG. 5A, and simultaneously the head part 44*a* formed on the bottom of the actuation shaft 44 is lifted. Accordingly, the head part 44*a* comes into close contact with the stop protrusion 41*a* with the packing 45 disposed therebetween, and thus the passage of the through hole 41*b* connected to the forceful pressure vent 42 is closed and also the internal pressure air of the cover 34 is prevented from leaking to the outside.

Accordingly, the emergency operation switch 40 can normally operate the diaphragm valve 30 in place of the normally operating solenoid valve 36 whenever the emergency operation switch 40 is manually pressed according to the determination of a manager when a pulse operation signal, such as a timer or the like, or the solenoid valve 36 fails. As a result, an emergency shutdown can be prevented from occurring during the operation of a dust collector and also a filter can be prevented from reaching a limit differential pressure, thereby preventing the lifespan of the filter from being shortened.

Meanwhile, the present invention is not limited only to the above-described embodiments but may be modified or altered and then practiced within a range that does not depart from the gist of the present invention, and the technical spirits to which such modifications or alterations have been applied should be viewed as also falling within the following claims.

The invention claimed is:

1. A dust collector diaphragm valve capable of performing manual emergency operation, the dust collector diaphragm valve comprising: a body configured such that an air inlet part and an air outlet part are formed in two directions as an internal air flow path and a passage are connected to each other; a cover configured such that a pressure vent is formed on one side thereof as an internal air flow path and a passage are connected to each other; a rubber plate configured to be installed between the body and the cover so that high-pressure air supplied through the air inlet part simultaneously fills both the air flow paths, forms equal pressure, and closes a passage of the air outlet part; a solenoid valve configured to be installed behind the cover so that an internal plunger instantaneously opens the pressure vent while being returned (moved forward) by elastic repulsive force after being instantaneously moved backward in response to a pulse operation signal, thereby dropping internal pressure in the air flow path; and a spring configured to be installed at a center of a back side of the rubber plate in order to return (move forward) the rubber plate until an operation of the solenoid valve is stopped and to thus make the rubber plate close the air outlet part; wherein an emergency operation switch configured to perform control so that the rubber plate is instantaneously moved backward and then returned (moved forward) by forcibly discharging high-pressure air inside the air flow path in the cover irrespective of the pressure vent whenever the emergency operation switch is manually pressed when a pulse operation signal and the solenoid valve fail and thus breaking equal pressure is installed on one side of the cover.

2. The dust collector diaphragm valve of claim 1, wherein the emergency operation switch is installed on one side of a periphery of the cover spaced apart from the pressure vent by a predetermined distance so that the air flow path of the cover and the passage can be connected to each other.

3. The dust collector diaphragm valve of claim 1, wherein the emergency operation switch comprises:

a body configured to be screwed through one side of the cover, and to have a through hole, in which a stop protrusion is formed inside the through hole at an intermediate height of the through hole, so that the air flow path and the passage can be connected to each other; a forceful pressure vent configured to be installed on one side of the body at the intermediate height of the body, and to always open the through hole; a coil spring configured to be inserted through a top of the through hole, and to be seated on a top of the stop protrusion; an actuation shaft configured to be disposed to pass through the top of the through hole, and provided with a head part on a bottom of the actuation shaft in order to control an amount of air to be discharged by means of pressing force while selectively opening and closing the passage depending on whether a lower portion of the actuation shaft comes into close contact with a bottom of the stop protrusion; a stop ring configured to be coupled to the actuation shaft at an intermediate height of the actuation shaft through a top of the body, and to receive elastic repulsive force of the coil spring and lift the actuation shaft when pressing force is released while the stop ring is pressing the coil spring; a sleeve configured to be inserted into an upper portion of the through hole, and to guide the actuation shaft through vertical movement while increasing tightness; and a push button configured to be fastened to an upper end of the actuation shaft.

4. The dust collector diaphragm valve of claim 3, wherein an O-ring-shaped packing configured to increase tightness when it comes into contact with a bottom of the stop protrusion is coupled to a central circumference of a top surface of the head part.

5. The dust collector diaphragm valve of claim 3, wherein the forceful pressure vent is connected to a passage of the through hole at a right angle at a location above a height of the stop protrusion.

6. The dust collector diaphragm valve of claim 3, wherein the actuation shaft is configured to maintain a predetermined interval in order to prevent circumferential surfaces from coming into contact with each other when the actuation shaft passes through the stop protrusion via a bottom of the through hole.

7. The dust collector diaphragm valve of claim 3, wherein the head part is configured to limit upward movement of the actuation shaft in such a manner that a top surface of the head part is caught on a bottom of the stop protrusion while maintaining a predetermined interval in order to prevent circumferential surfaces from coming into contact with each other when the head part passes through the stop protrusion via a bottom of the through hole.

\* \* \* \* \*